United States Patent [19]

Weinstein et al.

[11] 4,217,046
[45] Aug. 12, 1980

[54] FILM EXPOSURE DATA RECORDING APPARATUS

[75] Inventors: Marc D. Weinstein, 135 Eastern Pkwy., Apt. 13E, Brooklyn, N.Y. 11238; Michael C. Piazza, Jr., Ossining, N.Y.

[73] Assignee: Marc Weinstein, Brooklyn, N.Y.

[21] Appl. No.: 14,477

[22] Filed: Feb. 23, 1979

[51] Int. Cl.² .............................................. G03B 29/00
[52] U.S. Cl. ...................................... 354/76; 354/106
[58] Field of Search .................. 354/75, 76, 105, 106, 354/109, 230, 289; 235/61 PG, 64.7; 364/525

[56] References Cited

U.S. PATENT DOCUMENTS

| 3,827,070 | 7/1974 | Hoerenz et al. | 354/105 |
| 3,953,868 | 4/1976 | Kawamura et al. | 354/109 |
| 3,968,505 | 7/1976 | Kauneckas | 354/106 |

*Primary Examiner*—John Gonzales
*Attorney, Agent, or Firm*—Quaintance, Murphy & Richardson

[57] ABSTRACT

An apparatus is disclosed for use in conjunction with a camera for digitally recording film exposure information contemporaneously with the frame-by-frame exposure of the film within the camera and subsequently printing the recorded exposure information on a paper tape. The apparatus includes a reusable addressable memory and a central processing unit responsive to each frame-by-frame exposure of a film within the camera for controlling entry of digital information into the memory indicative of a plurality of film exposure criteria. An output interface is connected to the output of the memory and to a data printer which in turn prints the recorded data onto a paper tape record.

6 Claims, 2 Drawing Figures

FILM EXPOSURE DATA RECORDING APPARATUS

BACKGROUND OF THE INVENTION

1. Field of the Invention

The present invention relates generally to systems for recording operational camera data and particularly to a system for electronically storing exposure information contemporaneously with the exposure of film within a camera to be later transferred to a printed paper tape record in human readable form.

2. Description of the Prior Art

There exist many disclosures of methods and apparatus for recording various exposure criteria contemporaneously with the frame-by-frame exposure of film within a camera. The most rudimentary method was often to be found on early snapshot cameras and consisted generally of a narrow closed slit in the back of the camera which could be opened revealing the paper backing on the film. The person taking the picture could then use a pencil or pen and write the desired information directly on the backing of the film at the time of exposure. This method left much to be desired and with the advent of new camera designs was no longer feasible.

Two more modern methods of recording the exposure data on the film negative and/or slide film are variations of a central concept of photographically recording the information by exposing the film to an appropriately formatted set of numbers. One such system employs a series of stencils. Upon the exposure of the film, a small amount of light projects through the stencil forming an image on the film adjacent to the exposed frame on the film. The stencils are typically manually set but can also be mechanically linked to the various camera controls in such a way as to ensure correct recording to the various film exposure criteria.

A similar method substitutes light-emitting diodes (LEDs) for the stencils and various electronic circuits for the mechanical linkages. The LEDs are then caused to emit light onto a preselected portion of the film adjacent to the exposed frame and thus record the exposure data on the film.

A common problem of the last two methods is the loss of data by mounting the negative or slide film in standard slide mounts thereby masking the area in which the information is recorded. Loss of film image within the exposed frame also is encountered due to light diffusion from the LEDs or the stencils used to record the information or due to having information erroneously recorded in the image recording area of the film. Only rarely has the prior art considered the associated problem with this type of data recording which results from the various sensitivities of different types of film. Finally, a common problem is the unavailability of the recorded information prior to development of the film. Since the information itself might be valuable with respect to the development times and procedures to be used to obtain maximum image results, the photographic recording of exposure information proves itself to be totally unsatisfactory.

Examples of prior art systems are to be found in the following U.S. Pat. Nos. 4,053,909; 4,025,931; 4,001,846; 3,971,049; 3,968,505; 3,953,868; 3,906,523; 3,889,281; 3,858,967; 3,827,070; 2,907,985; and 2,821,124.

It is accordingly one object of the present invention to have an apparatus which records the film exposure information contemporaneously with the frame-by-frame exposure of the film within the camera but makes this information available prior to the development of film. It is a further object of the present invention to provide an apparatus for recording film exposure information which has no possibility of interfering with the desired picture intended to be captured by the exposed frame of film. Another object of the invention is to utilize electronic memory circuits to record the information relating to film exposure until such time as printout of the information is convenient. It is another object of the present invention to have a major portion of the apparatus incorporated within the body of the camera itself with the printing mechanism and associated electronics being a separate unit readily attachable to the camera at convenient periodic intervals.

SUMMARY OF THE INVENTION

The shortcomings of the prior art are overcome by having an apparatus for use in conjunction with a camera which digitally records the film exposure information contemporaneously with the frame-by-frame exposure of the film within the camera and subsequently prints the recorded exposure information on a paper tape in human readable form. The recording of the information is achieved by employing a control means for controlling entry of digital information into the memory. The control means is responsive to each frame-by-frame exposure of the film within the camera and selectively connects the memory to a plurality of signalgenerating means which generate signals indicative of the various film exposure criteria sought to be recorded. An output interfacing means is also provided connected to an output of the memory for interfacing the memory to a data printer. A data printer is provided which is connectable to the output of this interfacing means for printing the data output from the memory in human readable form on a paper tape record. The output interfacing means may be included with the camera body or may reside as a separate operational unit with the data printer.

DESCRIPTION OF THE PROFERRED EMBODIMENT

Figure 1:
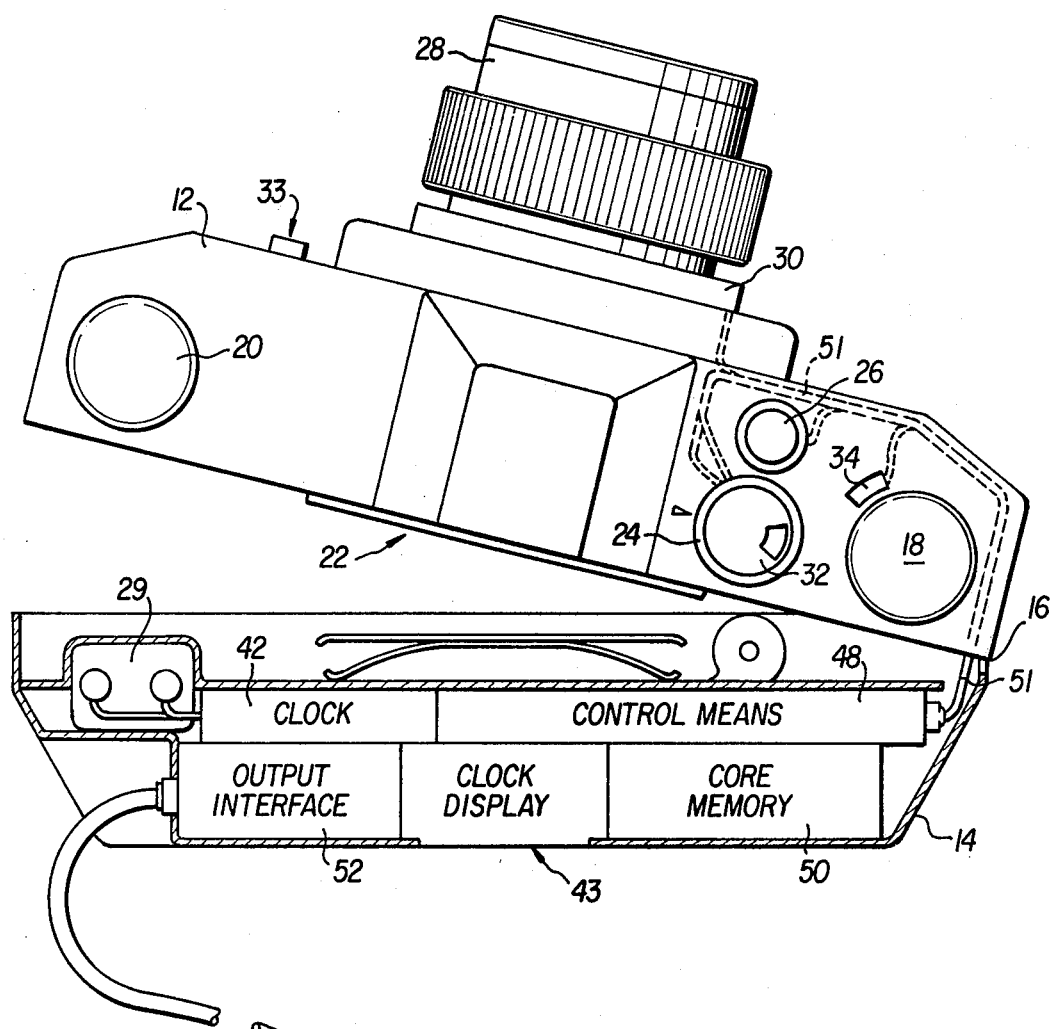
FIG. 1 is a diagrammatic view of a camera and the accompanying apparatus of the present invention.
Figure 1:
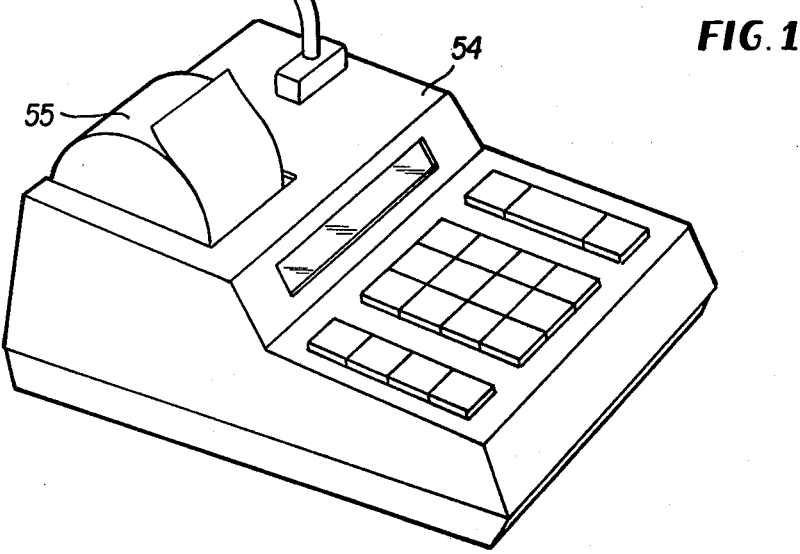

As shown in FIG. 1, a camera 10 comprises generally a camera body 12 and back 14 which is typically hinged to body 12 by hinge 16. Film is placed in the camera between take-up reel 18 and rewind reel 20 traversing a focal plane shutter area 22. The shutter is controlled conventionally by a shutter speed control 24 which specifies that the time duration the shutter is open and by a shutter trigger 26 which initiates the opening of the shutter when manually depressed by the operator of the camera. The shutter trigger 26 can also include a remote shutter trigger and/or a time-delayed shutter trigger for use in various situations where manual operation of shutter trigger 26 would be undesirable. The shutter speed, that is, the duration in time of the exposure is usually variable over a wide range of internally established times, for example, one-half to one five-hundredth of a second. In more expensive cameras, shutter speeds from 10 seconds to one two-thousandth of a second are available. Further, time exposures of essentially unlimited duration are possible with most cameras and the present invention is intended to record the exposure time to the clock limit, the limit being practically established by the number of counters in the clock recording circuits.

The lens system 28 of the camera typically includes an F-stop setting means 30 which controls the aperture size through which light from the object being photographed is permitted to impinge on the film. The F-stop setting means is typically found in the form of a ring which can be rotated about an axis of revolution axially coincident with the major axis of the lens system to change the aperture size. In typical single lens reflex cameras which include a light sensing means positioned behind the adjustable lens aperture or as otherwise located by the manufacturer, a film speed setting means 32 is also included. This film speed setting means 32 acts in conjunction with the F-stop setting means 30 and the shutter speed control means 24 to visually display to the camera operator the presence or absence of an acceptable light level for a particular photograph sought to be taken. There is also generally provided means 33 for the addition of a strobe or flash unit in the event the light level is unacceptably low. There is also generally included a counter 34 which indicates the number of frames which have been exposed on the roll of film which is present within the camera. All of the foregoing disclosure is by way of background only describing a typical embodiment of a camera in connection with which the invention can be employed.

The invention contemplates the use of a plurality of means for generating a like plurality of electrical signals indicative of the various exposure criteria. For example, a film ASA signal generating means 36 coupled to the film speed setting means 32 would generate an electrical signal indicative of the speed of the film as indicated by the set position of the film speed setting means. A film roll number generating means 37 can also be provided in the event the system of the invention is intended for use with more than one roll of film sequentially before readout.

An aperture signal means 38 is likewise connected to the F-stop setting means 30 for generating an electrical signal indicative of the aperture size. An exposure time means 40 can be connected to either the shutter speed control means 24 or to the shutter trigger 26 and a clock signal generator 42. In the first situation the exposure time means would generate a signal indicative of the setting of the shutter speed control means 24 while in the other form the exposure time means would generate a single indicative of the actual time that the focal plane shutter 22 were actually in the open position. These two numbers are intended to be equivalent but might vary due to mechanical difficulties which could be sensed by an exposure time means of the second indicated type. This information would be valuable to inform the operator of serious errors in shutter operation mandating immediate repair. A sensor of shutter operation 44 would also be included. Additionally, the exposure time can be displayed on the back 14 of the camera by a clock display means 43 which is driven by the clock signal generator 42. This display means 43 is particularly advantageous in long time exposure situations manually controlled by the camera operator.

In like manner, a frame number generator 46 could be connected to the counter 34 and such other signal generators as were desired such as strobe operation, time of day/date, etc., could also be included. The strobe operation generator means 45 could generate a signal based on sensing the current from the flash trigger 33 or on otherwise sensing strobe operation and possibly strobe power level and duration. The time of day/date information can be obtained from clock 42 with the addition of appropriate registers well known in the electronic watch art. The electrical power for the invention can be taken from any conventional power source 29.

Upon operation of the shutter trigger 26 or alternatively upon the indication of a shutter operation by sensor 44, a control means 48 would selectively record the various bits of data generated by the various signal generator means in memory 50, the signals being conveyed to the memory 50 by way of control means 48 through appropriate electrical signal conduits 51. Thus, with each frame-by-frame exposure of film within the camera, the various exposure criteria would be recorded in memory 50. Memory 50 could be any of a number of devices but preferably would consist of a large scale integrated circuit memory capable of storing the various exposure criteria for one or more rolls of film. With the advent of the large scale integrated circuits presently available, it is believed that an acceptably-sized memory might still be contained within the back 14 of the camera 10. The format and sequence of the data entry into memory 50 would be provided by control means 48.

At convenient intervals, the memory 50 may be caused to "read out" its contents by an appropriate output interface 52 to a printer 54. While as illustrated in FIG. 1, the output interface 52 is provided within the electronics of the camera and is wholly contained within back 14 of the camera 10, an alternative arrangement could include the output interface existing as an independent physical body between camera 10 and printer 54 or as an integral portion of printer 54. Convenient points for physical separation of components are illustrated at each of the major arrows illustrated in FIG. 2.

The printer 54 could in proper circumstance comprise simply a conventional printing calculator having appropriate modification made thereto so as to accept the data from output interface 52. The presence in the marketplace of inexpensive electronic printing calculators presents the artisan in this area with a multitude of satisfactory starting points for modification to permit operation as intended by the present invention.

Figure 2:
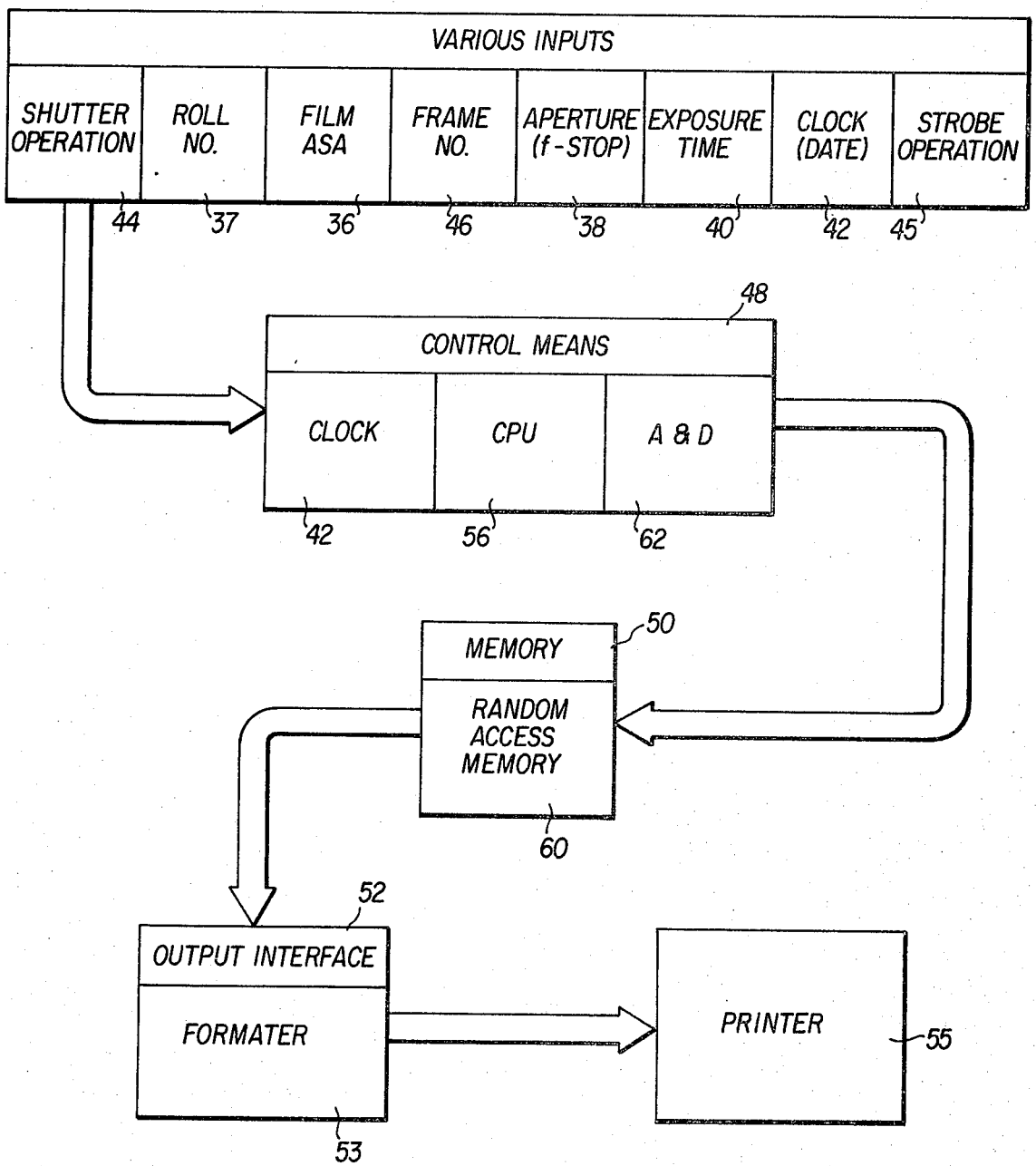
FIG. 2 is a block diagram of the functional relation of the various components of the present invention.

As illustrated in FIG. 2, the clock 42 generates continuously a timing signal which is fed to both an exposure time generator means 40 and to a central processing unit 56 of control means 48. A shutter signal means 58 triggers both the central processing unit into a time multiplexing data entry sequence which operates on the random access memory 60. The signals from the various signal means are then digitized by the analog to digital converter 62 and read into the memory in accordance with the time multiplexing sequence.

The output format from the memory 60 is determined by a combination of the output interface 52 and printer 54 and may be thought as an output format scheme 53. The resulting printout 55 then indicates in conventional form the various criteria recorded at the time of the frame-by-frame exposure of the film within the camera. If this printout 55 of the various film exposure criteria is made available prior to the development of the film, then a more intelligent decision as to any variations in routine film processing can be made which would ensure an enhanced photographic product. This is particularly important for commercial photography studios and the like where the economic impact of mis-developed film can be most severe. The printout medium 55 will most conventionally be a paper tape carrying the various criteria in human readable form. The term "paper tape" as used in this disclosure and in the claims is intended to include any sheet media on which characters are printed in the convention sense of data printers and typewriters but specifically excludes any media requiring the subsequent development by chemical means in the sense of film.

A further use of the present invention is to be found in its use by the novice for learning how to deal with particular photographic situations. The recorded information can be compared to the photographic result to teach the novice to more aptly operate the camera. Further, when used with automatic cameras employed for long term observation, a record of the conditions of each exposure can be retrieved prior to film development. This information can be used together with the visual information recorded on the film to scientifically evaluate the subject of the long term observation.

Appropriate variations and modifications of the preferred embodiment will be apparent to those having ordinary skill in the art and the disclosure herein is intended by way of example only and not be way of limitation, the limitation of invention to be defined by the appended claims.

What is claimed is:

1. An apparatus for use in conjunction with a camera comprising signal generating means for generating signals indicative of the various film exposure settings of the camera, core memory means for recording electronically the previously generated signals with each frame-by-frame of exposure of the film within the camera and printing means for subsequently printing the recorded exposure information on a paper tape.

2. Apparatus for use in conjunction with a camera for digitally recording film exposure information contemporaneously with the frame-by-frame exposure of the film within the camera and for subsequently printing the recorded exposure information on a paper tape in human readable form, the apparatus comprising:
    a re-usable, addressable memory,
    a control means, responsive to each frame-by-frame exposure of a film within a camera, for controlling entry of digital information into the memory,
    a plurality of signal means connected through the control means to the memory for generating signals indicative of a like plurality of film exposure information,
    an output interfacing means connected to an output of the memory for interfacing the output from the memory to a data printer, and
    a printing means connected to the output interfacing means for printing the data output from the memory in human readable form on a paper tape record.

3. The apparatus in claim 2 wherein said film exposure information comprises the shutter speed, the F-stop setting, frame number, and the ASA number.

4. The apparatus in claim 3 wherein said film exposure information further comprises roll number, time of day/date, and strobe operation.

5. The apparatus of claim 2 wherein the re-usable, addressable memory, the control means, and the plurality of signal means are physically included in the body and back of the camera.

6. The apparatus of claim 5 wherein the output interfacing means is also physically included in the body and back of the camera.